(12) United States Patent
Amesoeder et al.

(10) Patent No.: US 7,601,260 B2
(45) Date of Patent: Oct. 13, 2009

(54) ION EXCHANGER CONTAINER FOR A MOTOR VEHICLE

(75) Inventors: Dieter Amesoeder, Bietigheim-Bissingen (DE); Dieter Schreckenberger, Marbach (DE)

(73) Assignee: Mann & Hummel GmbH, Ludwigsburg (DE)

( * ) Notice: Subject to any disclaimer, the term of this patent is extended or adjusted under 35 U.S.C. 154(b) by 402 days.

(21) Appl. No.: 11/452,353

(22) Filed: Jun. 14, 2006

(65) Prior Publication Data

US 2006/0278571 A1  Dec. 14, 2006

(30) Foreign Application Priority Data

Jun. 14, 2005 (DE) .................. 20 2005 009 399 U

(51) Int. Cl.
*B01D 35/18* (2006.01)

(52) U.S. Cl. .................. 210/171; 210/186; 210/287; 210/289; 210/352

(58) Field of Classification Search .................. 210/184, 210/185, 186, 263, 287, 171, 289, 352; 165/119
See application file for complete search history.

(56) References Cited

U.S. PATENT DOCUMENTS

| 1,900,821 A | * | 3/1933 | Kline | .................. 210/133 |
| 4,381,926 A |   | 5/1983 | Karwat | |
| 4,669,533 A | * | 6/1987 | Hehl | .................. 165/47 |
| 4,987,313 A | * | 1/1991 | Baatz et al. | .................. 250/506.1 |
| 5,692,461 A |   | 12/1997 | Crovato et al. | |
| 2004/0025498 A1 | | 2/2004 | Lambert et al. | |

FOREIGN PATENT DOCUMENTS

| DE | 199 35 920 A1 | 3/2001 |
| DE | 20 2005 000 896 U1 | 5/2006 |
| JP | 2004-230215 A | 8/2004 |
| WO | WO 82/04197 A1 | 12/1982 |
| WO | WO 03/098015 A1 | 11/2003 |
| WO | WO 2006/084568 A1 | 8/2006 |

OTHER PUBLICATIONS

European Search Report dated Jan. 10, 2007 including English translation of pertinent portion (Eleven (11) pages).

* cited by examiner

*Primary Examiner*—Matthew O Savage
(74) *Attorney, Agent, or Firm*—Crowell & Moring LLP

(57) ABSTRACT

An ion exchanger vessel having a housing for receiving an ion exchange material and an inlet line and a discharge line in the housing for feeding and discharging a liquid to be passed through the ion exchange material. To heat the liquid, a heating medium is guided through the ion exchanger vessel, such that the heating medium is separated from the liquid to be passed through the ion exchange material.

3 Claims, 5 Drawing Sheets

ION EXCHANGER CONTAINER FOR A MOTOR VEHICLE

BACKGROUND OF THE INVENTION

The present invention relates to an ion exchanger vessel, particularly for use in a motor vehicle, having a housing for receiving an ion exchange material and an inlet line and discharge line in the housing for introducing and discharging a liquid to be passed through the ion exchange material.

Ion exchanger vessels of this type are used, for instance, in the exhaust tract of motor vehicles having an internal combustion engine to remove calcium ions from the water content in an aqueous urea solution. This prevents calcium deposits in injection nozzles used to inject the aqueous urea solution into the exhaust stream for oxygen reduction of nitrogen oxides. The ion exchanger decalcifies the water content in the urea solution to increase the life of the components coming into contact with the urea solution.

Because of the relatively high water content in the urea solution (the water content is approximately two-thirds), the problem is encountered that the freezing point of the solution is higher than the temperatures occurring during a hard frost, so that there is a risk that the aqueous solution will freeze.

SUMMARY OF THE INVENTION

The object of the invention is to provide an ion exchanger vessel, particularly for use in a motor vehicle, in which damage to components at low temperatures is prevented by simple measures. This is to be accomplished, in particular, without any additional expenditure of energy.

These and other objects are achieved in accordance with the present invention by providing an ion exchanger vessel comprising a housing for receiving an ion exchange material and an inlet line and discharge line in the housing for introducing and discharging a liquid for passage through the ion exchange material, in which the housing comprises a separate flow path for conducting a heating medium through the ion exchanger vessel to heat the liquid, such that the heating medium is separated from the liquid to be passed through the ion exchange material. Advantageous details and preferred embodiments of the invention are set forth in the following description.

To heat the liquid which is passed through the ion exchanger vessel for ion exchange, a heating medium circuit is provided on the housing, such that the heating medium within the heating medium circuit is conducted separately from the liquid that is passed through the ion exchanger vessel.

An ion exchanger vessel of this type ensures that the temperature of the liquid to be passed through the ion exchanger vessel is always kept within the range of the operating temperature, so that the liquid is prevented from freezing even if outside temperatures are low. During running operation, heat is transferred to the liquid through the heating medium circuit, so that the liquid can maintain its operating temperature.

If used in a motor vehicle, the heating medium can be the coolant of the internal combustion engine of the motor vehicle. The coolant is used to cool the internal combustion engine. After it flows through the cylinder housing of the internal combustion engine, the heated coolant is advantageously conducted to the ion exchanger vessel to heat the liquid to be passed through the ion exchange material. When engine coolant is used as the heating medium for the ion exchanger vessel, no additional energy is expended, for instance by using an external heat source.

Preferably, at least two housings are provided for the ion exchanger vessel, such that the outer housing encloses an inner housing which contains the ion exchange material. The liquid is passed through the inner housing containing the ion exchange material, and the heating medium is conducted between the inner housing and the outer housing. In particular, the heating medium may be conducted through a helical heating line, which runs along the outside of the inner housing, i.e., between the inner and the outer housing. This embodiment has the advantage that the two liquids will not be mixed even if a component fails. Rather, the liquid flowing through the ion exchange material remains separate from the heating medium even if a component is defective.

In another advantageous embodiment, an additional housing is provided, which is an intermediate housing disposed between the inner housing and the outer housing. This creates two gaps that are separated from each other, one between the inner housing and the intermediate housing and another between the intermediate housing and the outer housing. The liquid is advantageously introduced into the ion exchanger vessel through the inner gap. The heating medium, on the other hand, is conducted through the outer gap. Both liquids flow parallel over a large area, which enhances the heat transfer from the heating medium in the direction of the liquid to be passed through the ion exchange material.

Another advantageous embodiment provides for a deformable expansion element to be disposed in the housing adjacent the flow path of the liquid. This expansion element is, in particular, elastically deformable and compensates the increased volume of the water content in the liquid if the liquid freezes. The expansion element yields under the pressure of the freezing and expanding liquid, so that the volume available in the flow path of the liquid is increased. Because of the deformation of the expansion element, the high forces occurring during the freezing process cannot destroy the ion exchanger vessel or parts thereof.

The deformable expansion element may be constructed, in particular, as an annular element that radially limits the flow path of the liquid. When the liquid freezes, the annular element yields radially outwardly. Other configurations of the expansion element are also possible, however, e.g., in the form of two walls arranged crosswise axially in the flow path of the liquid, such that at low temperatures the wall thicknesses are compressed by the freezing liquid.

The ion exchange material is advantageously axially bounded inside the housing by a displaceable boundary disk. This displaceable boundary disk is also capable of compensating the volume when the liquid to be passed through the ion exchanger material freezes.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
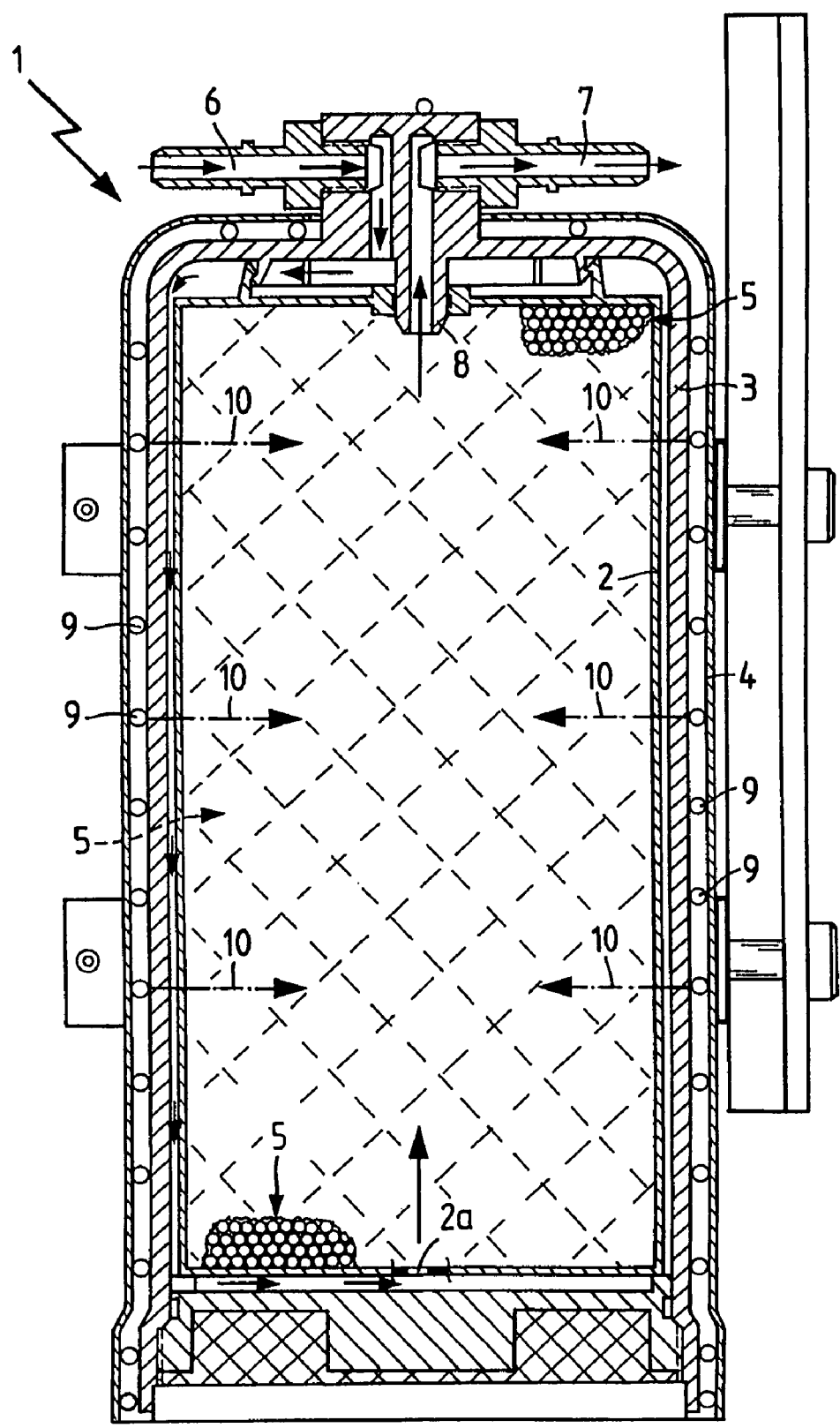
FIG. 1 is a sectional view of an ion exchanger vessel comprising three housings that are placed one over other, such that the inner housing contains an ion exchange material through which is passed a liquid from which calcium ions or other ions are to be removed, and an outer heating medium circuit is provided for heating the liquid.

In the figures, like components are identified by the same reference numerals.

The ion exchanger vessel 1 depicted in FIG. 1 is intended for use in a motor vehicle. An aqueous urea solution, which is injected into the exhaust stream for oxygen reduction of nitrogen oxides, is first passed through the ion exchanger vessel to decalcify the water content in the aqueous urea solution. In the ion exchanger, calcium ions contained in the water content are exchanged for sodium ions. This decalcifies the water and prevents calcium deposits on the components that come into contact with the aqueous urea solution.

The ion exchanger vessel 1 comprises three nested housings 2, 3 and 4, such that the inner housing 2 receives the ion exchange material 5, through which the aqueous urea solution is to pass. The aqueous urea solution is fed into the ion exchanger vessel 1 through an inlet line 6 and, after flowing through the ion exchange material 5 in the inner housing 2, flows out through a discharge line 7. The inlet line 6 and the discharge line 7 are located in the cover region of the ion exchanger vessel 1. After being fed through the inlet line 6, the urea solution is guided into a cylindrical gap formed between the inner housing 2 and the intermediate housing 3. In this gap, the urea solution flows downwardly to the floor region of the ion exchanger vessel, where the urea solution flows into the interior of the inner housing 2 through an opening 2a located in the floor of the inner housing 2. The urea solution flows through the interior and the ion exchange material 5 contained therein from the bottom to the top and is discharged through a central outflow fitting 8 in the cover region of the inner housing 2 into the discharge line 7.

To heat the aqueous urea solution, a heating medium is guided through the ion exchanger vessel 1. To this end, a heating line 9 for receiving the heating medium is run helically in the gap between the outer housing 4 and the intermediate housing 3. The heating medium flows through the helical heating line 9, such that the heat of the heating medium is transferred inwardly in the direction of arrow 10 and thereby heats the aqueous urea solution, which flows downwardly in the gap between the inner housing 2 and the intermediate housing 3, separately from the heating line 9. The heating line 9 extends helically over the axial length of the ion exchanger vessel and ensures a uniform heat transfer to the urea solution over the axial length. This maintains the temperature of the urea solution at a level which prevents the water content in the urea solution from freezing even if the outside temperatures are low.

The heating medium and the aqueous urea solution are separately guided through the ion exchanger vessel 1. Because the heating medium is guided in the heating line 9 and, furthermore, the intermediate housing 3 is between the heating line 9 and the aqueous urea solution, there is a double safeguard against any undesirable mixing of the two liquids if one of the components fails.

The heating medium used is in particular the coolant used for cooling the internal combustion engine of the motor vehicle.

Figure 2:
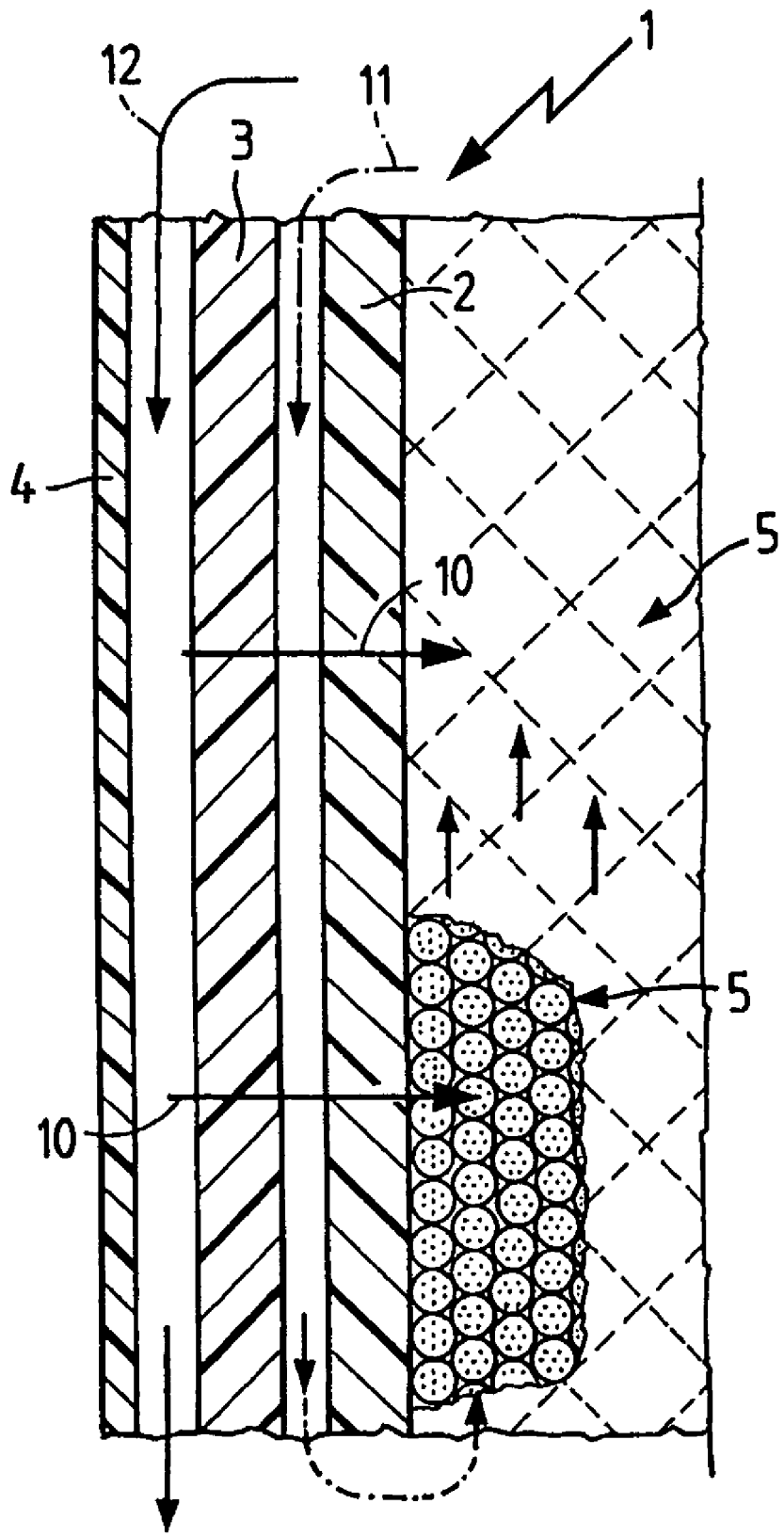
FIG. 2 is an enlarged detail viewed from the edge area of the ion exchanger vessel.

FIG. 2 shows a detail of a modified embodiment of an ion exchanger vessel 1. As in the preceding example, the ion exchanger vessel 1 comprises three housings 2, 3 and 4, with a gap each formed between them. The aqueous urea solution can flow downwardly through the inner gap between the inner housing 2 and the intermediate housing 3 in the direction of arrow 11. The heating medium is guided downwardly through the outer gap between the outer housing 4 and the intermediate housing 3 in the direction of arrow 12. In contrast to the first embodiment, the heating medium is not guided in a heating line but directly into the gap between the housings 3 and 4 in downward direction. The heat transfer occurs radially inwardly in the direction of arrow 10, such that the urea solution in the gap between the housings 2 and 3 and in the interior of the inner housing 2 is heated.

Figure 3:
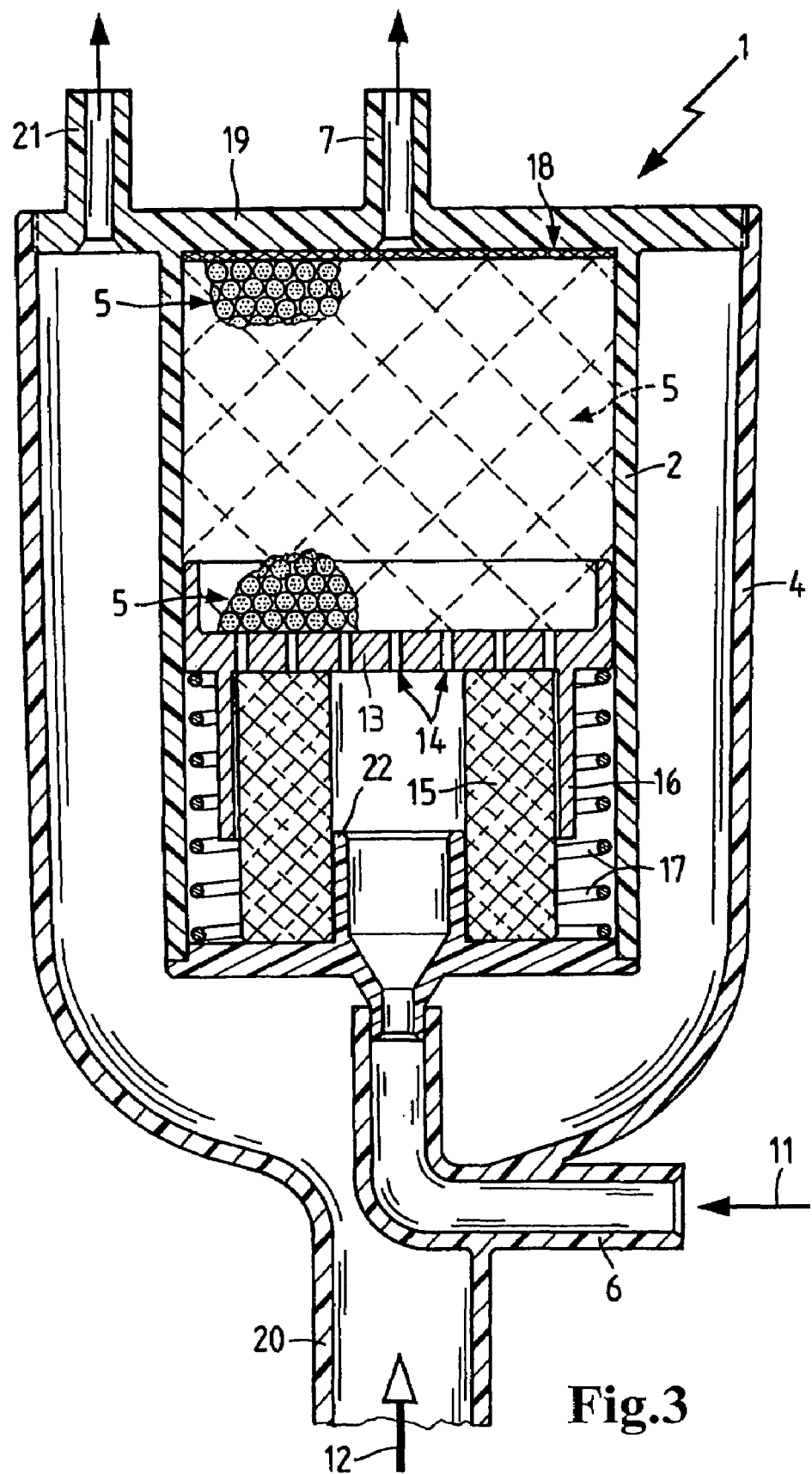
FIG. 3 is a sectional view of a modified embodiment of an ion exchanger vessel.

FIG. 3 illustrates another embodiment of an ion exchanger vessel 1. The vessel in this embodiment includes only two housings, an inner housing 2 and an outer housing 4. The inner housing 2 receives the ion exchange material 5, which is kept axially downwardly by a boundary disk 13 displaceably mounted within the inner housing 2. The boundary disk has flow openings 14 to allow the aqueous urea solution to flow through. The aqueous urea solution is introduced in the lower region of the ion exchanger vessel, through the inlet line 6 and the floor of the inner housing 2. In its further course, the aqueous urea solution flows through the flow openings 14 in the boundary disk 13 and subsequently makes contact with the ion exchange material 5. In the cover region, the interior containing the ion exchange material 5 is separated from the discharge line 7 by a nonwoven disk 18, which is permeable however for the aqueous urea solution. The inner housing 2 and a cover disk 19, into which the discharge line 7 is inserted as a fitting, form an integral plastic component. Where indicated, a two-piece configuration may also come into consideration.

The heating medium is also supplied to the ion exchanger vessel 1 through the floor. To this end, a fitting 20 is formed in the floor of the outer housing 4, through which the heating medium is guided into the gap between the inner housing 2 and the outer housing 4. The heating medium can be discharged from the ion exchanger vessel through a discharge fitting 21 formed integrally with the cover disk 19 and thus integrally with the inner housing 2. The fitting 20, through which the heating medium is introduced, forms an integral plastic component with the outer housing 4, as does the inlet line 6 for feeding the aqueous urea solution.

In the interior of the inner housing 2 is an expansion element 15, which is configured as an annular element and directly adjoins the opening in the floor of the inner housing 2 through which the aqueous urea solution is fed into the inner housing 2. The expansion element 15 is elastically deformable and is made, in particular, of an elastomer, such as EPDM. The expansion element 15 is supported radially outwardly by an annular wall 16, which is formed integrally with the boundary disk 13 and extends axially downwardly from the boundary disk. The expansion element is fixed radially inwardly by a fitting 22, which encloses the inlet opening in the floor and is formed integrally with the inner housing 2.

In the gap between the outside of the expansion element 15 and the inner wall of the inner housing 2 there is a spiral spring element 17, which flexibly supports the axially displaceable boundary disk 13 on the floor of the inner housing 2.

The deformable expansion element 15 is capable of compensating volume changes. If the aqueous urea solution freezes at low outside temperatures, the wall of the expansion element 15 is compressed to compensate the increased volume occurring as a result of the freezing process. This prevents damage to the fixed components in the ion exchanger vessel 1.

Figure 4:
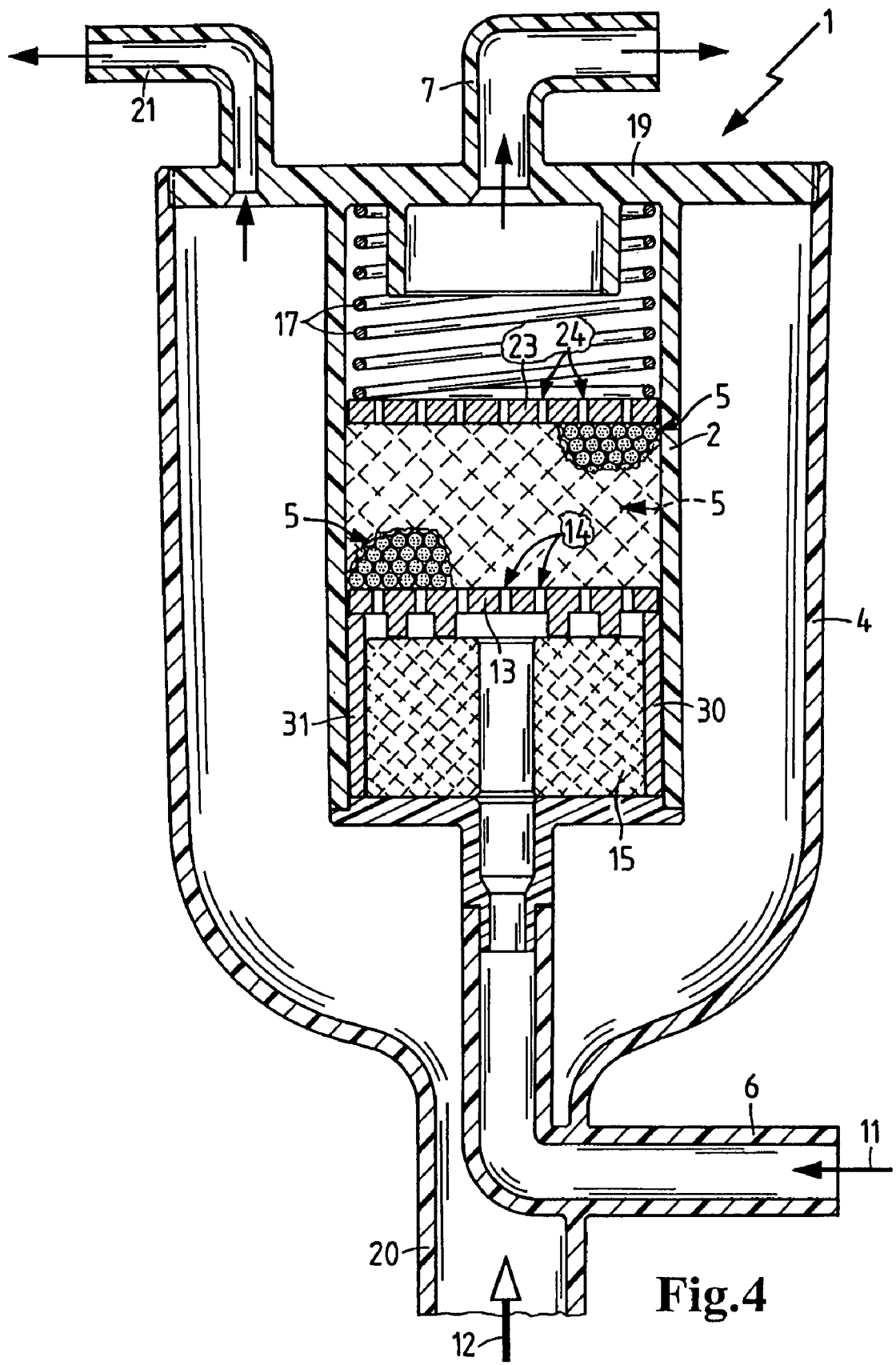
FIG. 4 is a sectional view of an additional ion exchanger vessel.

The embodiment depicted in FIG. 4 essentially corresponds to that of FIG. 3, except for the differences in the interior of the inner housing 2. The ion exchange material 5 is limited axially by a boundary disk 13 and 23, respectively. The boundary disk 23 is axially displaceable in the interior of the inner housing 2. The boundary disk 13 is limited in downward direction by an axial limit stop in the inner housing 2. This stop consists of webs 30, 31. Alternatively, the diameter of the inner housing 2 could be used as a stop if the diameter is correspondingly reduced.

In the lower region, an expansion element 15 is inserted into the interior of the inner housing 2. As in the preceding example, this expansion element is made of an elastically deformable material, particularly an elastomer, such as EPDM. The lower boundary disk 13 having the flow openings 14 for the aqueous urea solution rests against the expansion element 15. The space for receiving the ion exchange material 5 is upwardly limited by the second boundary disk 23, which is likewise provided with flow openings 24 for the discharge of the aqueous urea solution. The upper boundary disk 23 is pressed downwardly by a spiral spring element 17.

Figure 5:
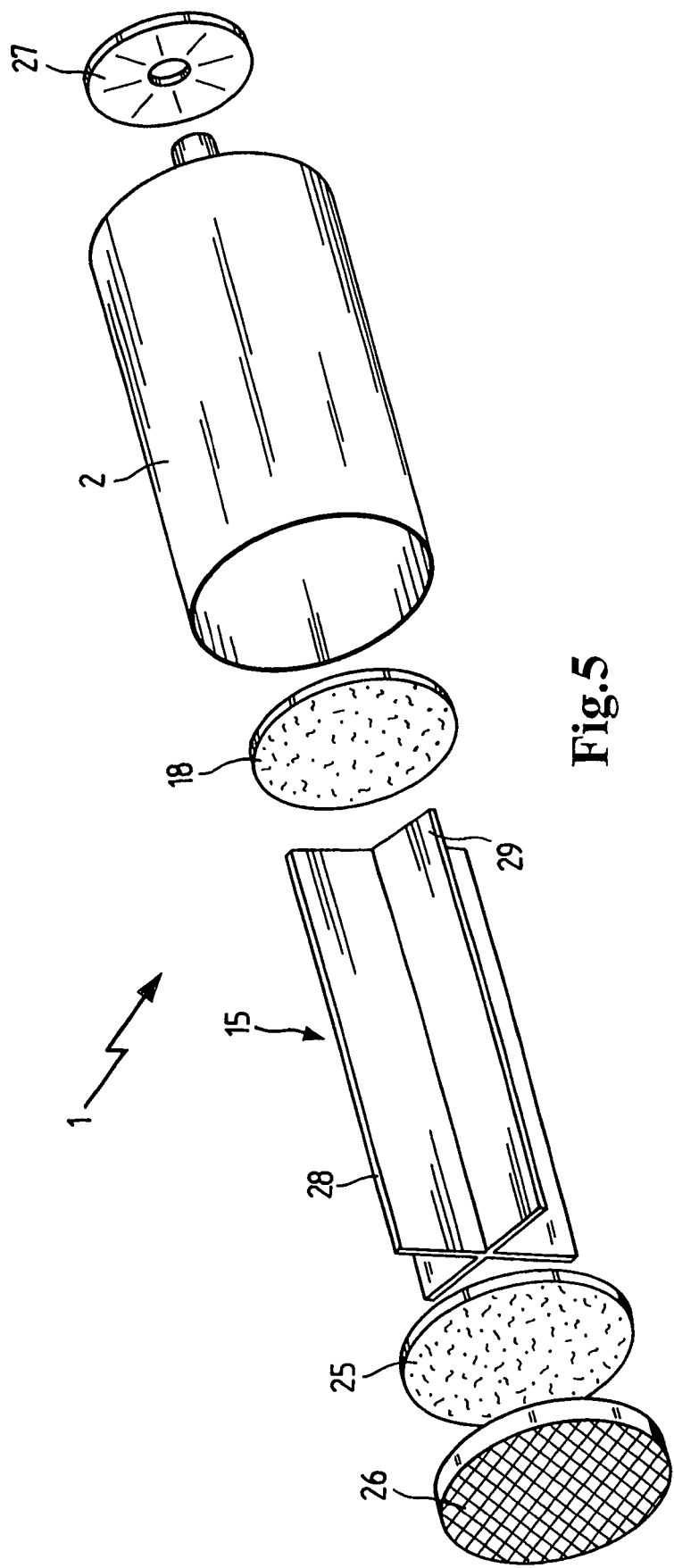
FIG. 5 is an exploded perspective view of the inner housing of an ion exchanger vessel with a cross-shaped expansion element disposed therein.

In the illustrative embodiment shown in FIG. 5 only the inner housing 2 of an ion exchanger vessel 1 is shown without the heating circuit. A nonwoven disk 18 is inserted into the cylindrical inner housing 2 at the top, followed by an expansion element 15 with two walls 28 and 29 arranged crosswise. The walls 28 and 29 of the expansion element 15 are made of an elastically deformable material. The ion exchange material is received in the four chambers separated by the walls 28 and 29. If the aqueous urea solution introduced into the interior of the housing 2 freezes, the walls 28 and 29, which are made of an elastic material, are compressed to compensate the increased volume taken up by the frozen urea solution.

In the region of the floor, an additional nonwoven disk 25 is used, so that a total of two nonwoven disks 18 and 25 axially limit the expansion element 15 at the two end faces. The closure is formed by a sieve plate 26. In the cover region at the top, an elastomer disk 27 is disposed on the inner housing 2, which is seated between the inner housing and the outer housing when the ion exchanger vessel 1 is assembled.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An ion exchanger vessel comprising a housing for receiving an ion exchange material and an inlet line and discharge line in the housing for introducing and discharging a liquid for passage through the ion exchange material, wherein said housing comprises a separate flow path for conducting a heating medium through the ion exchanger vessel to heat the liquid, such that the heating medium is separated from the liquid to be passed through the ion exchange material, wherein:
   the housing with the ion exchange material is an inner housing, which is enclosed by at least one additional housing;
   an outer housing is provided enclosing the inner housing such that the heating medium is conducted between the inner housing and the outer housing, and
   an intermediate housing is provided between the inner housing and the outer housing such that the liquid for passage through the ion exchange material is guided between the inner housing and the intermediate housing, and the heating medium is guided between the intermediate housing and the outer housing.

2. An ion exchanger vessel according to claim 1, wherein the heating medium is guided through a helical heating line along the outside of the housing containing the ion exchange material.

3. An ion exchanger vessel according to claim 1, wherein said separate flow path is connected to a coolant circuit of an internal combustion engine of a motor vehicle such that coolant from the engine can flow through said separate flow path as a heating medium to heat the liquid.

* * * * *